March 9, 1954  R. M. SCHWARZ  2,671,879
MULTISPEED SPLIT-PHASE MOTOR
Filed May 13, 1950  2 Sheets-Sheet 2
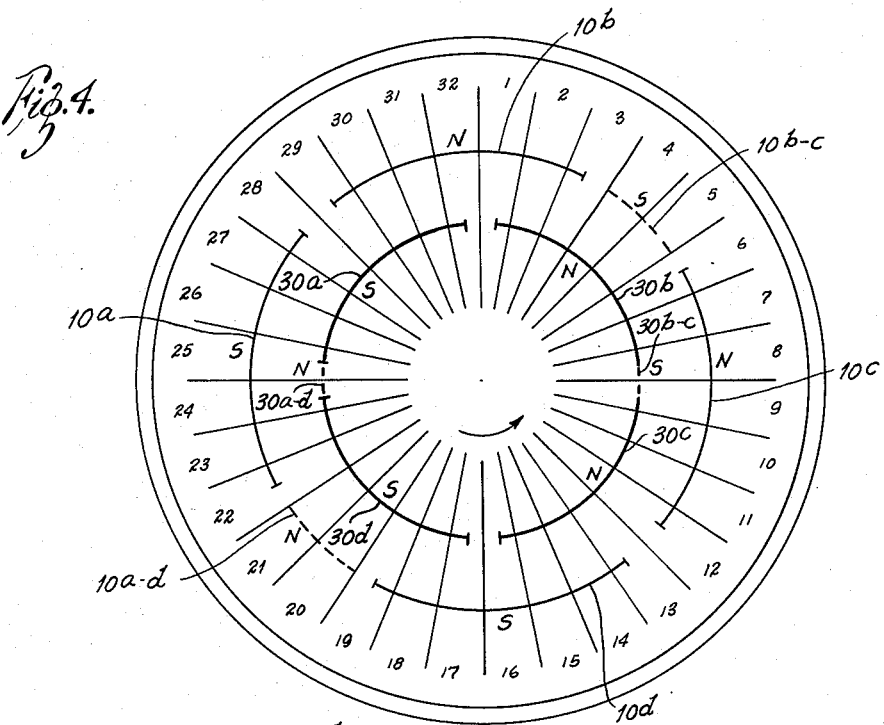
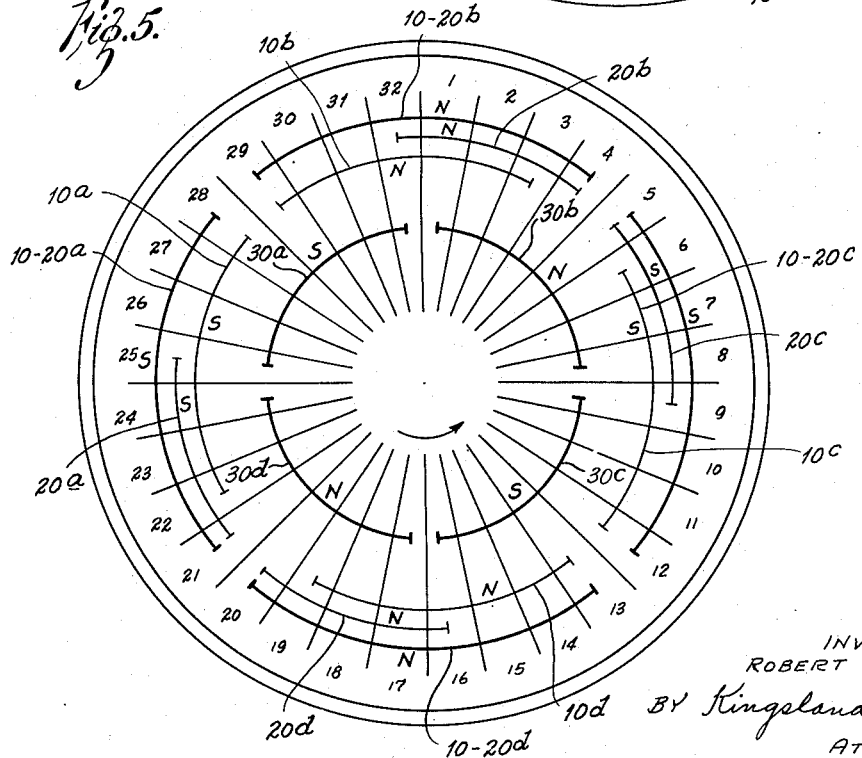
INVENTOR:
ROBERT M. SCHWARZ,
BY Kingsland, Rogers & Ezell
ATTORNEYS.

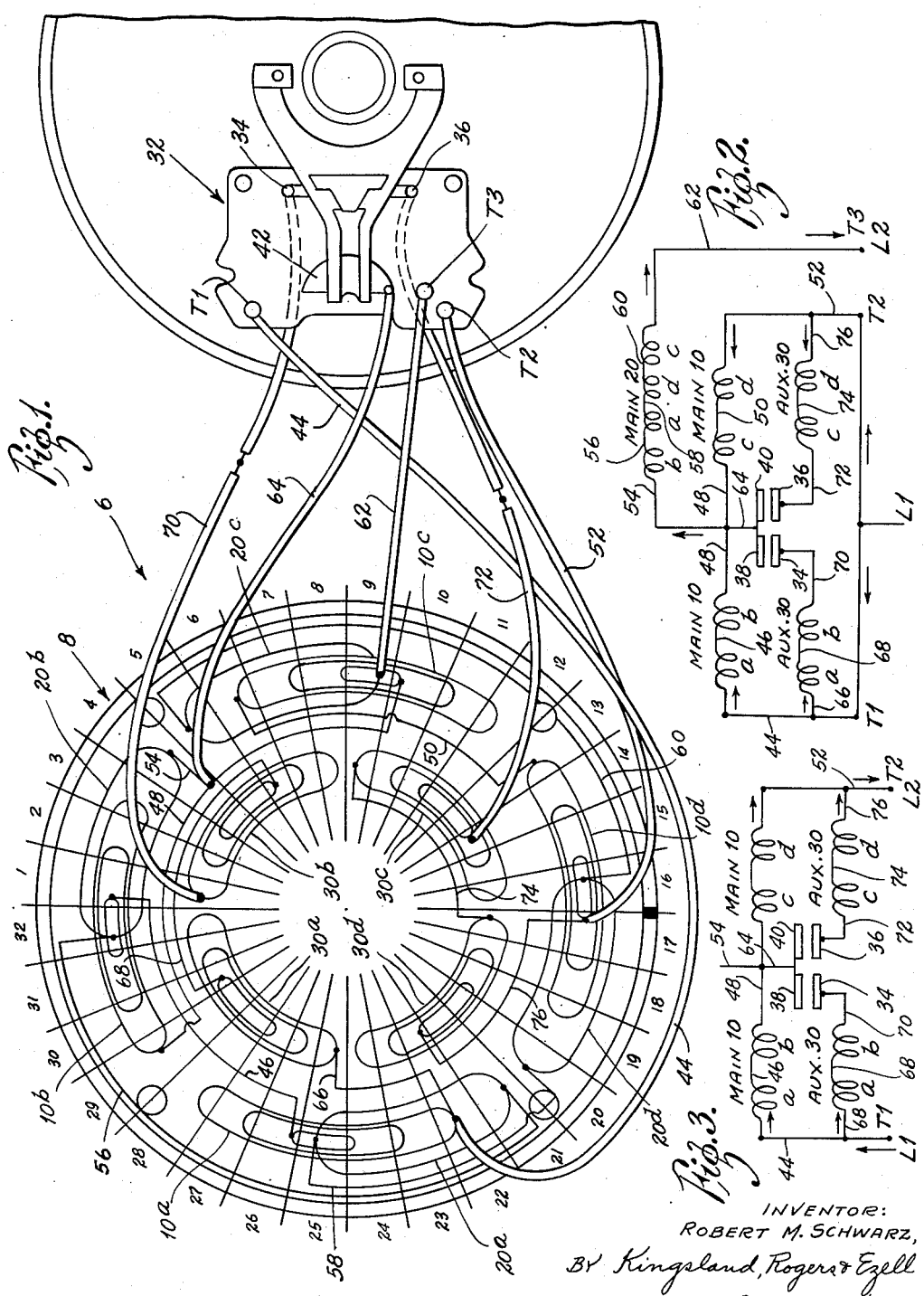

Patented Mar. 9, 1954

2,671,879

UNITED STATES PATENT OFFICE 2,671,879

MULTISPEED SPLIT-PHASE MOTOR

Robert M. Schwarz, Clayton, Mo., assignor to The Emerson Electric Manufacturing Company, St. Louis, Mo., a corporation of Missouri Application May 13, 1950, Serial No. 161,801

5 Claims. (Cl. 318—220)

The present invention relates to the dynamo electric machine art and more particularly to a novel, wound stator for a multi-speed split-phase motor, containing a single auxiliary winding.

In one form, the device comprises a stator containing two main windings, each of which includes a plurality of winding sets. The windings are displaced one from the other so that when both are energized there is provided a plurality of equi-spaced real main poles. When only one winding is energized, however, there is provided an increase of real and consequent main poles for reduced speed. The stator also contains a single auxiliary winding which includes the same number of winding sets as in each of the main windings. When the auxiliary winding is energized in one manner there is provided a number of equi-spaced real auxiliary poles equal to the number of equi-spaced real main poles. When the connections of the auxiliary windings are changed, however, an increased number of real and consequent auxiliary poles are provided which are equal in number to the real and consequent main poles.

The multi-speed split-phase motors in use at the present time employ a plurality of auxiliary field windings in order to provide a different number of field poles for the different operating speeds at which the device is designed to operate. This has many disadvantages, a few of which are that it requires that the wire size be small so that the various sets of coils can be crowded into the same slots; there are a large number of line leads, and only one winding is in operation during starting at each selected operating speed.

It is an object of the present invention, therefore, to provide a wound stator for a multi-speed split-phase motor, which contains a single auxiliary winding which can be used for starting at any one of a plurality of operating speeds. More particularly, it is an object to provide a single auxiliary winding which can be selectively connected to provide either of two sets of unequal numbers of poles when the entire winding is energized. Specifically, it is an object to provide a single auxiliary winding which can be selectively connected to provide either a predetermined number of equi-spaced real poles or an increased number of both real and consequent poles.

Further objects and advantages of the present invention will be apparent from the following description, reference being had to the accompanying drawings wherein a preferred embodiment of the present invention is shown, in which:

Fig. 1 is a wiring diagram of a wound stator and switch embodying the teachings of the present invention;

Fig. 2 is a schematic wiring diagram of the construction shown in Fig. 1, connected for 4-pole operation;

Fig. 3 is a schematic wiring diagram of the construction shown in Fig. 1, connected for 6-pole operation;

Fig. 4 is a schematic diagram of the stator indicating the pole structure for low speed (6-poles); and Fig. 5 is a schematic diagram of the stator indicating the pole structure for high speed (4-poles).

In the drawing and description the invention is exemplified in a two-speed motor which can be so connected as to have either 4 or 6-poles; but it is to be understood that this is merely illustrative and that the invention is equally applicable to a 6-8 pole motor, etc.

Referring to the drawings more particularly by reference numerals, 6 indicates generally a wound stator constructed in accordance with the teachings of the present invention for use with a conventional rotor, as for example, of the squirrel cage type.

The device 6 includes a laminated core 8, which, in the illustration, contains 32 slots which are numbered clockwise starting at the top.

Disposed in these slots in a manner to be described, are two sets of main windings 10 and 20, each of which contains 4 sets of coils which are identified by the letters a to d, inclusive.

As indicated in Fig. 1, main coil 10a extends from slot 22 to slot 28, main coil 10b extends from slot 29 to slot 3, main coil 10c extends from slot 6 to slot 12, and main coil 10d extends from slot 13 to slot 19.

Main coil 20a extends from slot 21 to slot 25, main coil 20b extends from slot 32 to slot 4, main coil 20c extends from slot 5 to slot 9, and main coil 20d extends from slot 16 to slot 20.

Also disposed in these same slots is an auxiliary winding 30 which contains 4 sets of coils identified by the letters a to d, inclusive.

Auxiliary coil 30a extends from slot 25 to slot 32, auxiliary coil 30b extends from slot 1 to slot 8, auxiliary coil 30c extends from slot 9 to slot 16, and auxiliary coil 30d extends from slot 17 to slot 24.

The main and auxiliary coils are connected to a conventional type starting switch 32 (Fig. 1) which includes two sets of contacts 34—36 and 38—40 (Figs. 2 and 3) which are normally closed but which open when the rotor (not shown) reaches a predetermined speed so as to cut out the auxiliary winding. Contacts 38 and 40 are joined together by a plate 42 (Fig. 1).

The switch 32 also contains 3 terminal posts T1, T2 and T3.

A lead 44 is connected between T1 and one side of the coil main 10a, the other side of coil main 10a is connected to one side of main 10b by a conductor 46, the other side of main 10b is connected to one side of main 10c by a conductor 48, the other side of main 10c is connected to one side of main 10d by a conductor 50, and the other side of main 10d is connected to T2 by a lead 52.

Connected to the conductor 48 is one end of a conductor 54, the other end of which is connected to one side of the coil main 20b. Main 20b and 20a are connected together by a conductor 56, main 20a and main 20d are connected together by a conductor 58, main 20d and 20c are connected together by a conductor 60, and the other side of main 20c is connected to T3 by a lead 62.

Also connected to the conductor 48 adjacent its mid-point, is one end of a lead 64, the other end of which is connected to the plate 42.

Connected to one end of the coil 10a and the lead 44 is one end of a conductor 66, the other end of which is connected to one side of coil auxiliary 30a. The other side of auxiliary 30a is connected to one side of auxiliary 30b by a conductor 68, and the other side of auxiliary 30b is connected to the contact 34 by a lead 70. Connected between the contact 36 and one side of the coil auxiliary 30c, is a lead 72. The other side of auxiliary 30c and one side of auxiliary 30d are connected together by a conductor 74, and the other side of auxiliary 30d is connected to the end of the lead 52 by lead 76.

For low speed operation (6-poles) a line L1 is connected to the terminal T1, and a line L2 is connected to the terminal T2.

Assuming that the direction of current flow through the main windings 10 and 20 is as indicated in Fig. 3, main 10a will be a real south pole (Fig. 4), main 10b will be a real north pole, main 10c will be a real north pole, and main 10d will be a real south pole. The magnetic flux from these real poles will induce a consequent south pole 10b—c between main 10b and main 10c, and a consequent north pole 10a—d between main 10a and main 10d (Fig. 4).

If the flow of current through the auxiliary windings is as indicated in Fig. 3, auxiliary 30a will be a real south pole, auxiliary 30b will be a real north pole, auxiliary 30c will be a real north pole, and auxiliary 30d will be a real south pole. These will induce a consequent south pole 30b—c between auxiliary 30b and auxiliary 30c, and a consequent north pole 30a—d between auxiliary 30a and auxiliary 30d (Fig. 4). This provides 6 main poles, and 6 auxiliary poles which are angularly displaced from the main poles as shown in Fig. 4.

For high speed operation (4-poles) line L1 is connected to the terminal T1 and T2, and line L2 is connected to the terminal T3.

With the flow of current through the main windings 10 and 20 in the directions indicated in Fig. 2, main 10a and main 20a will both be real south poles. As shown in Figs. 1 and 5, these poles are slightly displaced one from the other so that together they form a resultant real south pole 10—20a which extends between the outer extremities of both main poles. In like manner, main 10b and 20b are both north poles and form a resultant north pole 10—20b, main 10c and 20c are south poles and form a resultant south pole 10—20c, and main 10d and 20d are north poles and form a resultant north pole 10—20d. These resultant poles are of equal strength and are equally spaced around the stator so that noise and vibration are reduced to a minimum.

The flow of current through the auxiliary windings 30, in the directions indicated in Fig. 2, cause auxiliary 30a to be a south pole, auxiliary 30b to be a north pole, auxiliary 30c to be a south pole and auxiliary 30d to be a north pole.

This provides 4 equi-spaced auxiliary poles which are exactly between the 4 equi-spaced resultant main poles.

Thus, there is provided a stator which contains a single auxiliary winding which can be used in two speed operations with substantially as good an overall performance as when two full auxiliary windings are used.

Removal of one set of auxiliary windings permits the remaining auxiliary winding to be made from larger conductors, thereby materially reducing the loss in the windings. Also, there are fewer line leads and fewer sets of windings when only one auxiliary winding is used so that the cost of material and labor is considerably reduced. The same winding is always used to start the motor regardless of the selected operative speed so that there is never an auxiliary winding remaining idle during the starting period, as is the case with two full auxiliary windings. Furthermore, the current density in the auxiliary winding for either selected operating speed is approximately the same so that it is not necessary to overdesign for one of the speeds.

Thus, it is apparent that there has been provided a novel wound stator for a multi-speed split-phase motor which fulfills all of the objects and advantages sought therefor.

It is to be understood that the foregoing description and the accompanying drawing have been given only by way of illustration and example, and that changes and alterations in the present disclosure, which will be readily apparent to one skilled in the art, are contemplated as within the scope of the present invention, which is limited only by the claims which follow.

What is claimed is:

1. A wound stator for a multi-speed split-phase motor, comprising overlapping main winding means for selectively providing various numbers of main poles; a single auxiliary winding including a plurality of sets of coils for providing a plurality of real auxiliary poles of alternate polarity; and means for selectively changing the relative polarity of some of the auxiliary poles so as to continue to have real poles of different polarity and to produce one consequent auxiliary pole for each real auxiliary pole of changed polarity.

2. A wound stator, for a multi-speed split-phase motor, comprising two main windings each including two groups of overlapping sets of coils; a single auxiliary winding containing two groups of sets of coils; and means for selectively connecting the groups of auxiliary sets in parallel, and in parallel with the groups of sets of one of the main windings and in series with the other winding so as to provide a predetermined number of resultant real main poles and an equal number of real auxiliary poles; or connecting the auxiliary winding in series, and in parallel with only one of the main windings so as to provide a predetermined number of real and consequent main poles and an equal number of real and consequent auxiliary poles.

3. A wound stator for a multi-speed split-phase motor, comprising overlapping main winding means for selectively providing various numbers of main poles; a single auxiliary winding including a plurality of non-overlapping sets of coils for providing a plurality of real auxiliary poles of alternate polarity; and means for selectively changing the relative polarity of one-half the number of real auxiliary poles so as to provide auxiliary poles which are equal in number to the number of real poles.

4. A wound stator for a multi-speed split-phase motor, comprising overlapping main winding means for selectively providing various numbers of main poles; a single auxiliary winding including a plurality of non-overlapping sets of coils for providing a plurality of real auxiliary poles of alternate polarity; and means for selectively changing the relative polarity of one-half the number of real auxiliary poles so as to have real auxiliary poles of like polarity in groups of two with groups of two real auxiliary poles of opposite polarity on each side thereof so as to provide consequent auxiliary poles between each two real auxiliary poles of like polarity.

5. A wound stator of a multi-speed split-phase motor, comprising a first and a second main winding each having an equal plurality of sets of coils connected in series and spaced at unequal angular distances around the stator, said first main winding having a center top for selectively connecting respective halves of its total number of winding sets in parallel, an auxiliary winding having a plurality of sets of coils equal to the said plurality of sets of coils in each of the main windings, said sets of coils in the auxiliary winding being spaced at equal angular distances around the stator, means for selectively connecting said sets of coils in the auxiliary winding either in series or respective halves of the total number thereof in parallel, said first main winding with its sets of coils connected in series and said auxiliary winding with its sets of coils connected in series being connectible in parallel each to provide a real pole for each set of coils therein and each to provide also a consequent pole for each pair of real poles, said real and consequent poles for each winding being of alternate relative polarity around the stator, said first main winding with its sets of coils connected in parallel as aforesaid, and said auxiliary winding with its sets of coils connected in parallel as aforesaid being also connectible in parallel with each other and in series with said second main winding to provide resultant real main poles and real auxiliary poles each equal in number to the number of sets of coils in each of the several windings, said resultant real main poles and said real auxiliary poles respectively being of alternate relative polarity around the stator.

ROBERT M. SCHWARZ.

References Cited in the file of this patent

UNITED STATES PATENTS

| Number | Name | Date |
|---|---|---|
| 1,859,369 | Kennedy | May 24, 1932 |
| 1,880,565 | Weichel | Oct. 4, 1932 |
| 1,918,323 | Dederick et al. | July 18, 1933 |
| 1,983,741 | Dederick | Dec. 11, 1934 |
| 2,409,891 | Packer | Oct. 22, 1946 |